Dec. 16, 1958 E. K. DOMBECK 2,864,468
FRICTION DEVICE

Filed Oct. 11, 1955 3 Sheets-Sheet 1

INVENTOR.
EDWARD K. DOMBECK
BY John A. Young
ATTORNEY

Dec. 16, 1958  E. K. DOMBECK  2,864,468
FRICTION DEVICE
Filed Oct. 11, 1955  3 Sheets—Sheet 3

INVENTOR.
EDWARD K. DOMBECK
BY
John A. Young
ATTORNEY

United States Patent Office 2,864,468
Patented Dec. 16, 1958

2,864,468

FRICTION DEVICE

Edward K. Dombeck, South Bend, Ind., assignor to Bendix Aviation Corporation, South Bend, Ind., a corporation of Delaware Application October 11, 1955, Serial No. 539,790

10 Claims. (Cl. 188—70)

This invention relates to a friction device in which laterally actuated "disk" elements are directly applied by the operator, and reaction from the application of said disk elements is used to apply an arcuate "shoe" friction element.

It is an object of the invention to provide a device of the class described which is characterized by performance stability and consistency while encountering high temperatures which are incident to heavy duty kinetic-energy-absorbing applications.

One of the foremost objects of the invention is to improve brake controllability so that retarding effort of the brake on the vehicle can be gauged by the amount of applying efforted exerted by the operator. The result is that brake performance is made proportional to applying effort.

The friction device may, of course, be used in a number of applications such as, for example, either a brake or a clutch. Wherever it is desired by frictional means to control relative movement between two members, the present invention might be considered to apply and particularly so where the conditions encountered present serious thermal hazards to proper performance.

A further object of the invention is to provide a friction device having free floating friction elements which are spaced apart by a rim member so that a greater torque may be developed in applying an arcuate "shoe" portion thereof.

By construction features such as the spaced apart relation of the disk elements, it is my aim to prevent damage to the anchor member when the disk elements become worn. This feature also simplifies the construction of the rest of the parts of the device.

Other objects and features of the invention will become apparent from a consideration of the following description which proceeds with reference to the accompanying drawings, wherein:

Figure 1 is a side elevation of the brake assembly with portions thereof broken away to better illustrate the friction units and applying lever;

Figures 2, 3, 4, and 5 are section views taken on the respective lines indicated in Figure 1;

Figure 1:
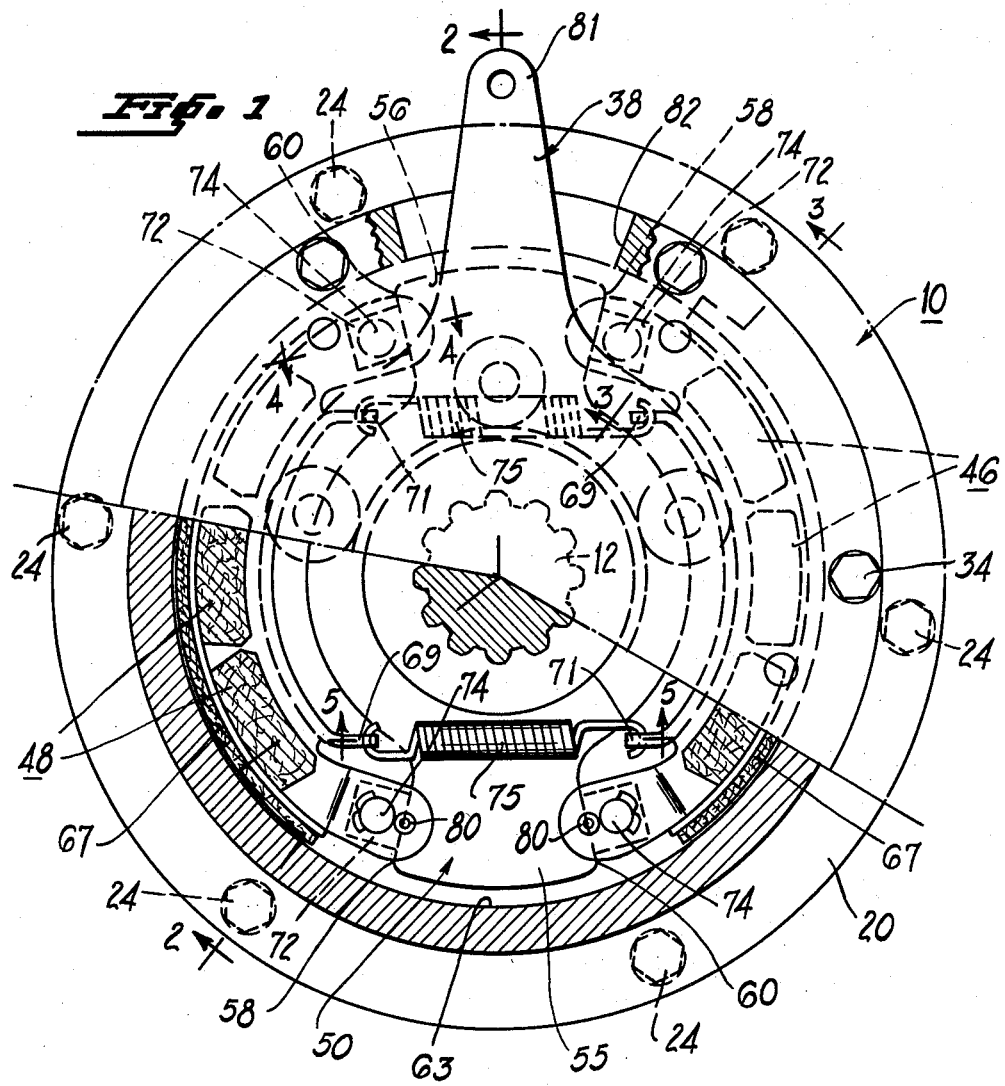

The device, designated generally by reference numeral 10, is shown here as a brake located on the jack shaft 12 of a tractor. The device, in addition to serving the normal functions of a brake, is also used for steering the tractor. The invention is thus related to copending application Serial No. 389,212, filed October 30, 1953, and application No. 534,339, filed September 14, 1955, which also may be used in the tractor braking art.

Figure 2:
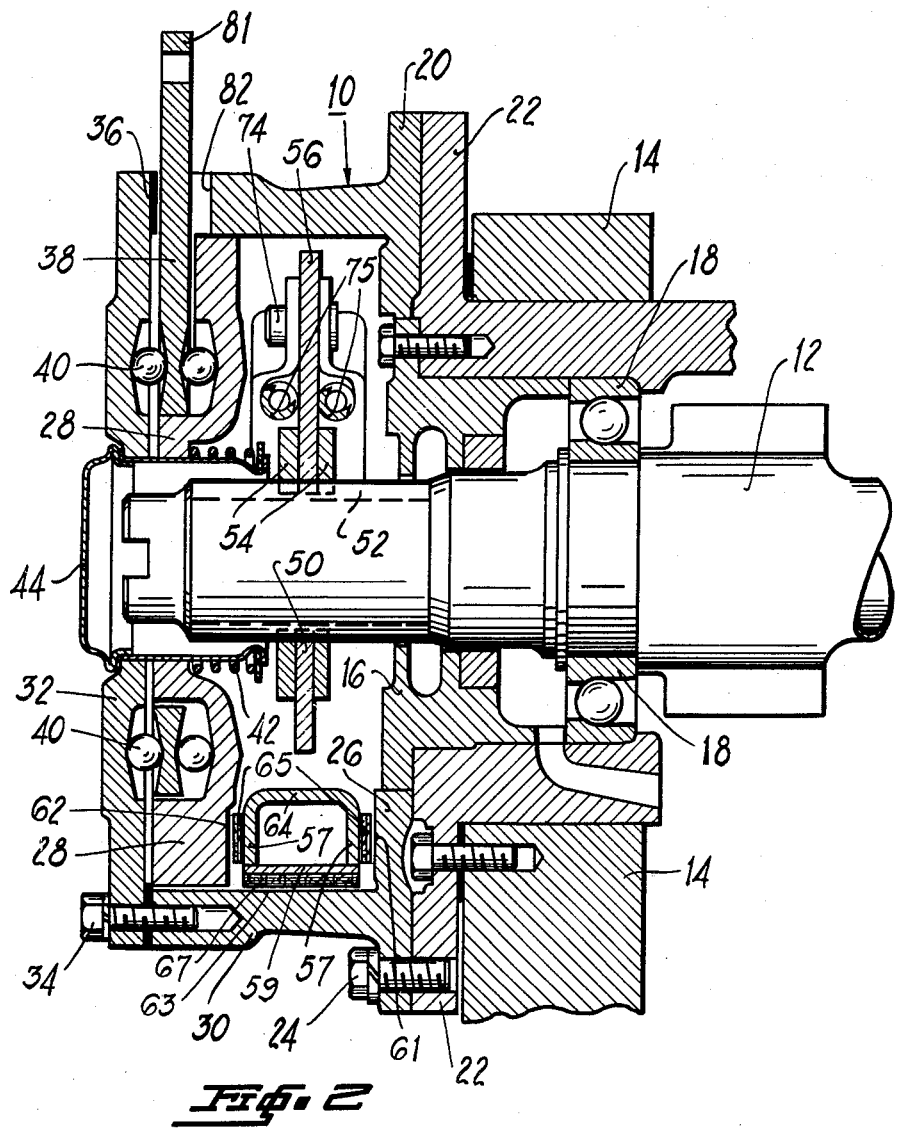

Referring to Figure 2, the jack shaft 12 is shown extending through a transmission case 14 and bearing cap 16 and is supported on an anti-friction bearing 18.

A stator 20 is secured to bearing carrier 22 by means of bolts or the like 24. The sides of the stator are made up of a reaction plate 26, and a laterally movable pressure plate 28; the third side of the stator is a cylindrical housing 30.

A backing plate 32 is secured to the housing 30 by means of bolts 34. A number of shims 36 are used to separate the backing plate 32 and housing 30. Shims may be added or removed to adjust the unit in the manner descirbed in copending application No. 534,339.

Between the pressure plate 28 and backing plate 32 is located an applying lever 38 and a plurality of spaced ball-ramp camming devices 40 which are arranged to impart a lateral thrust on the pressure plate 28 when the handle 38 is moved circumferentially relative to the pressure plate 28 and backing plate 32. The pressure plate 28 is held in a normally retracted position by a spring 42 and cup-shaped member 44.

The invention principally concerns the construction of friction units 46 and 48 which are carried by a torque plate 50 that is driven by jack shaft 12 through a spline connection 52. The torque plate is stiffened by two reinforcing plates 54 which are located on either side thereof at the center of the torque plate. The torque plate has two diametrically extending anchoring projections 55 and 56 with diverging sides 58 and 60 that provide anchoring surfaces for the brake units.

Each of the brake units is identically constructed so that only one of them will be described in detail. Friction unit 48 consists of two laterally spaced apart sides 57 and an arcuate rim 59 secured to said sides so that they are spaced apart by the width of the rim 57 A stiffening side 64 joins sides 57 to give rigidity to the unit. Spaced segments of friction material lining 65 are secured to the spaced sides 57 and an arcuate lining segment 67 is secured to the rim 59. During the course of the description, the friction material lined sides 57 are referred to as "disk" friction elements since they are laterally applied and the friction material lined rim 59 is referred to as a "shoe" friction element since it is radially applied and is engageable with a cylindrical surface 63 of the brake housing 30.

Referring to the bottom portion of Figure 2, the right hand "disk" friction element is engageable with surface 61 of reaction plate 26; the left hand "disk" friction element is engageable with the surface 62 of pressure plate 28; and the "shoe" friction element 59 is engageable with surface 63 of cylindrical brake housing 30.

Figure 5:
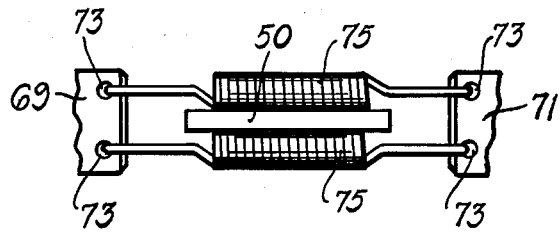
Figure 6:
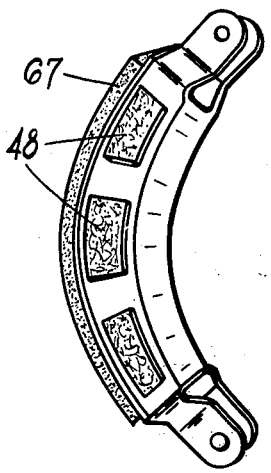
Figure 6 is a perspective view of one of the friction units.
Figure 7:
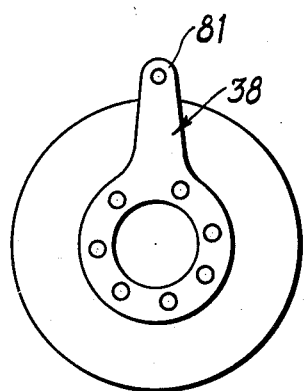
Figure 7 is a plan view of the applying lever.

The ends 69 and 71 of side 64 are turned back and are provided with openings 73 which are spaced along the width thereof (Figure 5). Springs 75 are fastened at opposite ends in the openings 73 of the respective units to urge the adjacent ends thereof into operative abutment with sides 58 and 60 of a torque-taking member having anchoring projections 55 and 56 It will be noted from Figure 5 that the springs 75 are spaced on opposite sides of the anchoring projection to prevent offset loading on the friction units tending to tilt them laterally at the anchoring ends.

At the ends of the friction units (Figure 4) the sides 57 are collapsed together to loosely embrace and overlap the anchoring projection 55. Intermediate each of the anchoring projections 55 and 56 there is an anchor block 72 which is received between the collapsed portions of sides 57, and an anchor pin 74 passes through aligned openings 76 in the sides 57 and anchor block 72. The springs 75 urge the ends of the brake units together so that anchor blocks 72 which are carried by the ends of the friction units, forcibly engage sides 58 and 60 of the anchor projections 55 and 56. Beacuse of the flat characteristic of the engaging sides of the anchor blocks and projections 55 and 56, slidable movement is permitted which enables floatable suspension of the brake units. Because the units are free to shift radially, this ensures complete engagement between cylindrical surface 63 of the brake housing and the "shoe" friction element 59.

Figure 4:
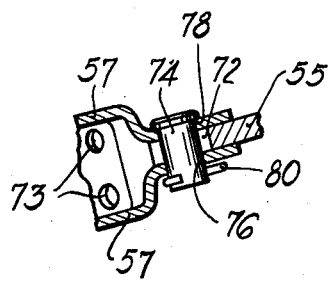

The brake unit turns on anchor pins 74 to permit pivotal actuation of the brake unit at either of the opposite ends thereof. The anchor pin 74 is held in position by a shoulder 78 at one end and a cotterpin 80 at the other (Figure 4). One of the chief advantages in the anchor arrangement shown is that the components (anchor pin and anchor block) can be hardened separately and in quantity than is possible in casehardening a part of the brake unit. The greater convenience and lower cost of this procedure makes it possible to manufacture the device at a considerable saving in time and cost.

The applying lever 38 has a handle 81 extending through a slot 82 in the housing 30. The slot permits limited angular movement of the handle in order to turn the lever 38.

When the brake is applied, the handle 81 is moved toward the left in Figure 1, thus producing relative circumferential movement between the applying lever 38, pressure plate 28 and backing plate 32. This relative movement causes the camming devices 40 to exert laterally directed applying force on the pressure plate 28, forcing it toward the right.

Figure 3:
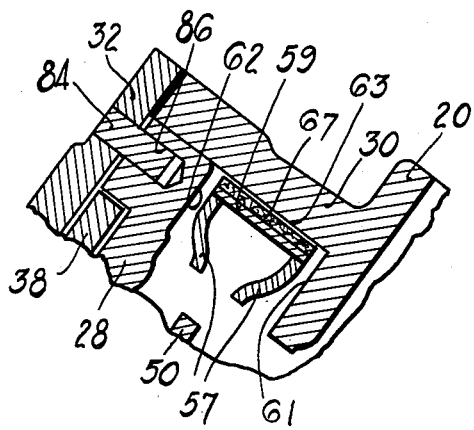

Assuming forward vehicle movement, the jack shaft 12 is turning in a direction which produces clockwise rotation of the torque plate 50 and brake units (Figure 1). When the pressure plate 28 is biased toward the right (Figure 2) surface 62 is brought into forcible engagement with the friction material lining on the left hand "disk" element 65 in Figure 2. The entire unit is forced toward the right bringing the right hand disk element into forcible engagement with surface 61 of reaction plate 26. The brake unit is thus clamped between the circumferentially fixed pressure plate 28 and reaction plate 26, the pressure plate 28 being held against circumferential movement by a plurality of pins 84 which are fixed at one end to the backing plate 32 and extend into openings 86 in the pressure plate (Figure 3).

When the friction units 46 and 48 are thus clamped between the sides of the stator 20, they are caused to pivot at the ends thereof associated with anchor projections 55 and 56. Unit 46 is caused to pivot at side 58 of anchoring projection 56 and unit 48 is caused to pivot at side 58 of anchoring projections 55. This pivotal movement of the units brings the friction material lined rims 59 (the "shoe" portions of the units) into forcible engagement with the cylindrical surface 63 of the brake housing 30.

When the brake is released, the return springs 75 retract the expanded ends of the units causing them to reengage the anchoring projections. Spring 42 (Figure 2) returns the pressure plate 28 to its original position, thus disengaging the "disk" elements with the sides of the stator.

The units are suspended in the rotor since the ends thereof are urged against the divergent sides 58 and 60 of the anchoring projection. The force of spring 75 holding the ends against the anchor keeps the shoe ends from moving in a radial sense when the units are retracted.

During brake application with reverse vehicle movement (counterclockwise rotation of the jack shaft and brake units in Figure 1), the lever is turned counterclockwise by operator's applying effort. The pressure plate 28 is forced toward the right (Figure 2) and the sides of the friction unit are clamped between the reaction plate 26 and pressure plate 28, causing brake unit 48 to pivot on the end associated with anchor projection 56 and unit 46 is caused to pivot on the end associated with anchor projection 55. When the units pivot, the friction material lined rims of both units (constituting the "shoe" portions thereof) are thereby forcibly engaged with the cylindrical surface 63 of the brake housing 30. During brake application, the anchoring ends of the shoes are free to slide relative to the anchoring projections 56 and 55, thus ensuring complete contact between the friction material lining on the arcuate rim and engageable surface 63 of the brake housing.

When the brake is released, the springs 75 disengage the "shoe" portions of the units from surface 63 of the brake housing, and spring 42 returns the pressure plate to its original position.

One of the important structural advantages of the present invention is brought out in Figure 2. It will be noted from a cross-section view of the device that the sides of the friction unit are spaced apart by the width of the rim 59. Spacing the friction material lining in this manner makes it possible to form the reaction plate 26 and pressure plate 28 as flattened members. The structural simplification in construction of the pressure plate and reaction plate results in considerable saving in cost and manufacturing difficulty. It is also possible by this construction to locate the lining segments 65 closer to the rim 59 and thus increase the lever arm of the rotor reaction force which causes turning of the unit for application of the "shoe" portion thereof.

From a consideration of the description of the device, it will be understood that I have obtained all of the objectives of the invention. Although only a single embodiment of my invention has been described, it will be further understood by those skilled in the art that the objects of this invention may be attained by the use of constructions different in certain respects from those disclosed without departing from the underlying principles of the invention.

I claim:

1. In a kinetic-energy-absorbing device, a rotatably driven torque plate having diametrically extending anchor projections with divergent sides, and two arcuate box-shaped cross section friction units arranged in end to end relation, each of said friction units having friction material lining on the opposite sides and outer arcuate surface thereof, an anchor block mounted between the sides of each unit at the ends thereof and engageable with the associated side of the anchor projection, and an anchor pin pivotally connecting the ends of each unit and the associated anchor blocks, the sides of each unit at the ends thereof being laterally offset to embrace the anchor projection, and resilient means fastened between the adjacent oppositely movable ends of said units to retain them in operative abutting relation with said anchor projection whereby said units are suspended and held in a normally released position.

2. In a kinetic-energy-absorbing device having a stator with three friction-element-engaging sides: a rotor, and two friction units each drivably associated with said rotor and comprising laterally spaced apart sides joined by an arcuate rim, friction material lining secured to each of said sides and rim, anchor blocks received between the sides of said units at the ends thereof, anchor pins passing through the ends of said units and anchor blocks to pivotally support said units at the ends thereof.

3. A free floating friction unit provided in a kinetic-energy-absorbing device having a torque-taking member, said unit including two spaced-apart parallel members having oppositely-facing friction material lining secured thereto, an arcuate rim joining said parallel members and having friction material lining secured to the outer surface thereof, and means associated with each of the opposite ends of said unit which provide for pivotal movement between each of the ends of said unit and associated torque-taking member, said means being drivably combined with said unit at the remote ends thereof.

4. In a kinetic-energy-absorbing device, a rotatably driven torque plate having diametrically extending anchor projections and two arcuate box-shaped cross section friction units arranged in end to end relation, each of said friction units having friction material lining on the opposite sides and outer arcuate surface thereof, an anchor block mounted between the sides of each unit at the ends thereof and engageable with the associated side of the anchor projection, and an anchor pin pivotally connecting the ends of each unit and the associated anchor blocks, the sides of each unit at the ends thereof being laterally offset to embrace the anchoring projection.

5. A friction device including a rotatably driven torque plate having diametrically extending anchor projections with divergent sides, and at least one acruate box-shaped cross section friction unit, said friction unit having friction material lining on the opposite sides and outer arcuate surface thereof, an anchor block mounted between the sides of said unit at the ends thereof and engageable with the associated side of the anchor projection, an anchor pin pivotally associating the end of said unit with said anchor block, the sides of said unit at the ends thereof being laterally offset to embrace the diametrical anchor projections, and resilient means to retain the expansible ends of said unit in operative abutting relation with said anchor projections whereby said unit is suspended and held in a normally released position.

6. In a friction device, a rotatably driven torque plate, a friction unit mounted for pivotal movement relative to said torque plate, said friction unit having a box-shaped cross section construction including three friction members, two of which are spaced apart and substantially parallel, the third of said members serving to join the other two members, and laterally movable means for clamping the two parallel members of said unit to cause said unit to pivot.

7. In a kinetic-energy-absorbing device, a friction unit having two spaced apart substantially parallel sides with friction material secured thereto, a rim to which said sides are transversely secured in spaced apart relation, friction material secured to said rim, and anchoring means drivably mounted in the ends of said unit which permit pivotal and sliding movement relative to a fixed anchoring surface.

8. In a friction device; two rotatable friction units each having spaced-apart parallel oppositely facing friction members rigidly joined by an arcuate friction member, and anchor means drivably associated with each of said friction units, each of said friction units being pivoted with respect to the associated anchor means.

9. In a brake, two friction units each having two spaced apart parallel friction members, a third friction member rigidly joining said two parallel friction members, each of said friction members being relatively fixed one with respect to the other, means rotatively driving said friction unit, and pivot means about which the friction unit turns during braking.

10. In a brake according to claim 9, a stator having three spaced sides engageable with said three friction members respectively of the friction units, one of said sides being laterally movable to clamp the spaced parallel members of the friction units whereby the friction units are caused to turn thereby bringing the third friction member against the associated stator side.

References Cited in the file of this patent

UNITED STATES PATENTS

| | | |
|---|---|---|
| 1,976,419 | Taylor | Oct. 9, 1934 |
| 2,086,538 | Dabney | July 13, 1937 |

UNITED STATES PATENT OFFICE
CERTIFICATE OF CORRECTION

December 16, 1958

Patent No. 2,864,468

Edward K. Dombeck

It is hereby certified that error appears in the printed specification of the above numbered patent requiring correction and that the said Letters Patent should read as corrected below.

Column 2, line 30, after "57" insert a period; line 53, after "56" insert a period; column 3, line 10, before "quantity" insert -- greater --.

Signed and sealed this 21st day of July 1959.

(SEAL)
Attest:
KARL H. AXLINE
Attesting Officer

ROBERT C. WATSON
Commissioner of Patents